United States Patent [19]
Hartwick et al.

[11] 4,085,049
[45] Apr. 18, 1978

[54] SKIMMING APPARATUS

[76] Inventors: Norman John Reid Hartwick; Donald Charles Clayton Lathe, both of Box 1994, Drayton Valley, Ontario, Canada

[21] Appl. No.: 683,145

[22] Filed: May 4, 1976

[30] Foreign Application Priority Data

Apr. 2, 1976 Canada .................................. 245038

[51] Int. Cl.$^2$ ............................................. B01D 17/00
[52] U.S. Cl. ......................... 210/242 S; 210/DIG. 25
[58] Field of Search ................. 210/73 W, 169, 242 S, 210/DIG. 25

[56] References Cited
U.S. PATENT DOCUMENTS

| 3,237,774 | 3/1966 | Schuback | 210/242 S |
| 3,688,909 | 9/1972 | Titus et al. | 210/242 S |
| 3,700,109 | 10/1972 | Lasko | 210/242 S |

FOREIGN PATENT DOCUMENTS 1,177,776  1/1970  United Kingdom ........ 210/DIG. 25

Primary Examiner—Frank A. Spear, Jr.
Assistant Examiner—Richard W. Burks
Attorney, Agent, or Firm—Beveridge, De Grandi, Kline & Lunsford

[57] ABSTRACT

A skimming device for removing oil and similar products from the surface of water. The device is self-adjusting in that its skimming rate and the depth of skim are controlled by the rate that the skimmed fluid is removed from the device.

7 Claims, 7 Drawing Figures

SKIMMING APPARATUS

This invention relates to oil skimming devices for use in water and in particular to a skimming device wherein the depth of skim is automatically controlled by the rate at which skimmed fluid is removed from the reservoir.

Numerous forms of oil skimming devices have been recently proposed in view of the rising environmental threats due to accidental spills of petroleum products, particularly oil spills from watercraft. However, the known devices are usually complex in nature and require complicated mechanisms for controlling the depth of skim.

The device according to the present invention provides a solution to the skim depth problem by providing a cylindrical reservoir with a weir edge, the depth of skim thereof being automatically controlled by the rate at which skimmed fluid is removed from it.

According to a broad aspect therefore, the invention relates to a device for removing oil and like products from the surface of water comprising at least a pair of spaced float members with a shaft interconnecting said members; an elongated, open sided reservoir having a weir edge, said cylinder being mounted on said shaft for free rotation thereon, the central longitudinal axis of said reservoir being offset rearwardly with respect to the axis of said shaft whereby flotation of said reservoir lowers the front weir edge thereof to allow fluid to enter the reservoir over the weir; and whereby removal of skimmed fluid from the reservoir controls the depth of skim.

Figure 1:
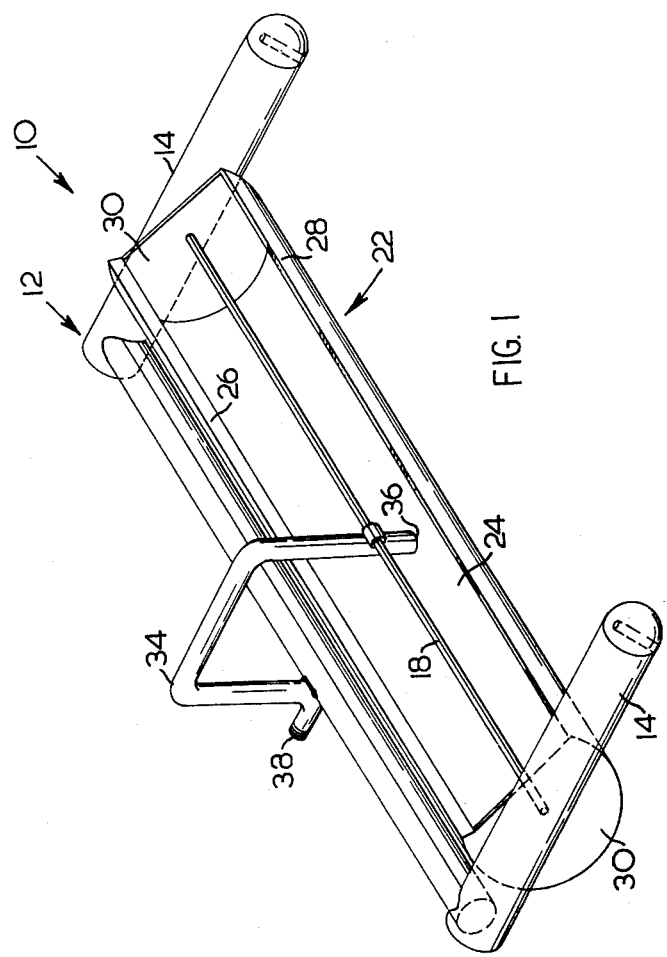
Figure 2:
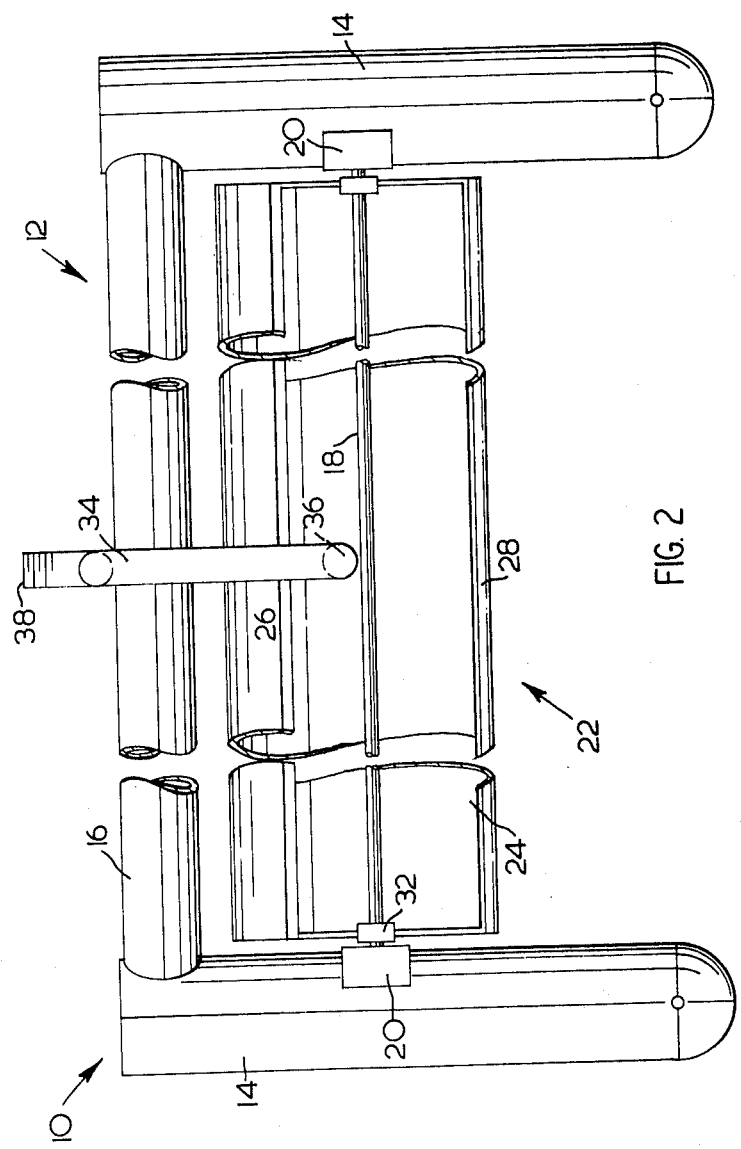
Figure 3:
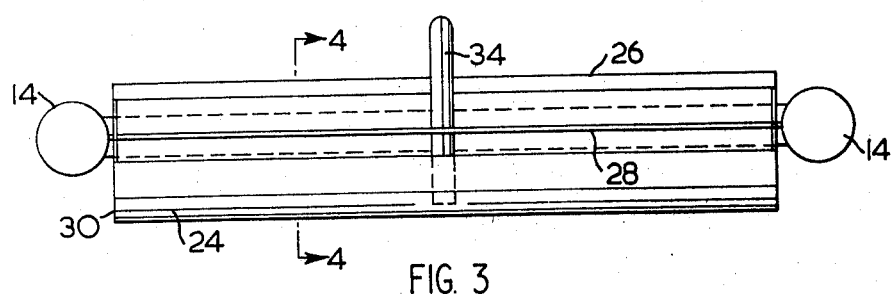
Figure 4:
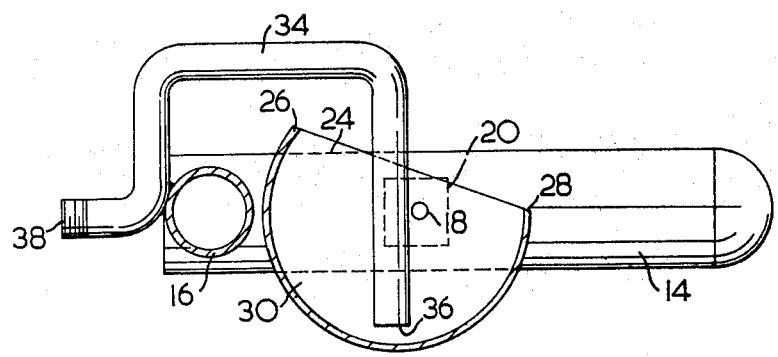
Figure 5:
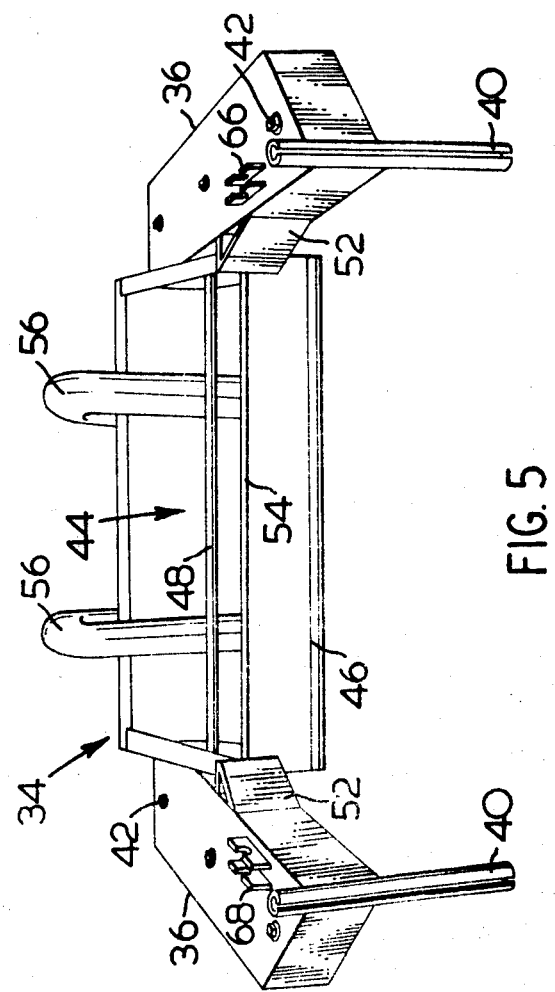
Figure 6:
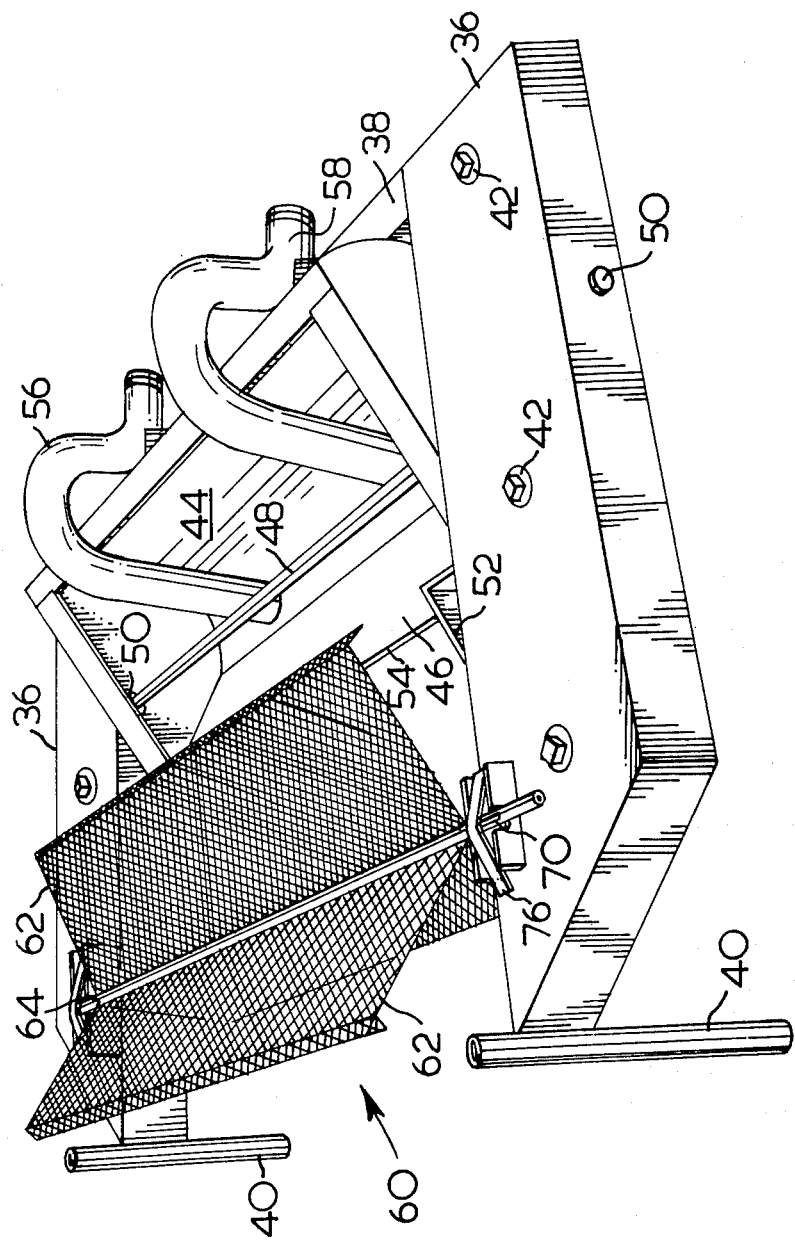
Figure 7:
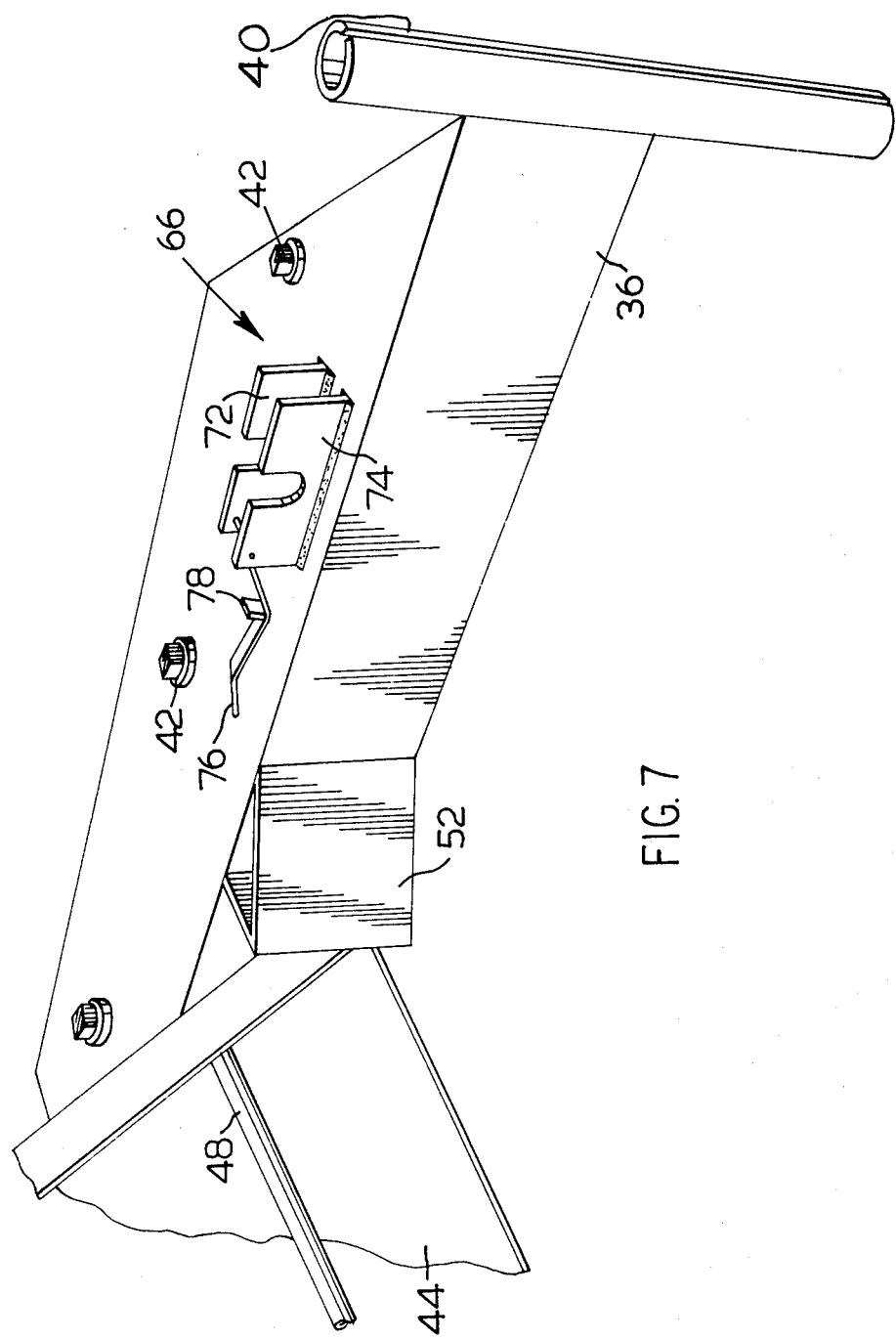

The invention is illustrated by way of example in the accompanying drawings in which:

FIG. 1 is a perspective view of the skimming device;
FIG. 2 is a plan view of the device;
FIG. 3 is a front elevation view;
FIG. 4 is a cross sectional view taken along the line 4—4 of FIG. 3;
FIG. 5 is a frontal view of a second embodiment of the invention;
FIG. 6 is a perspective view of the skimmer shown in FIG. 5; and
FIG. 7 is a fragmentary view of one of the floats.

Referring to FIGS. 1-4, the skimming device 10 has an open floating frame 12 comprising a pair of spaced side floats 14 connected adjacent their rear ends by a third or rear float 16. In addition, the side floats 14 serve to support the terminal ends of a shaft 18 which may be mounted in the floats by means of reinforcing pads 20 as shown in FIG. 2.

A fluid reservoir 22 is mounted between the floats 14 and consists of an open sided cylinder 24 having a rear edge 26 and a front, weir edge 28. The cylinder has end plates 30 provided with suitable bearings 32 by means of which the cylinder is mounted for free rotation on the shaft 18.

As shown in FIG. 4, the pivot mounting location points of the shaft 18 in the end plates 30 of the cylinder 24 are off-set forwardly with respect to the central longitudinal axis of the cylinder 24 so that when the latter is placed in the water there is greater flotation behind the axis of the cylinder than ahead of it, causing the cylinder 24 to rotate on the shaft 18, lowering the front weir edge 28 below the fluid surface and allowing fluid to enter the reservoir over the weir 28. As the cylinder 24 fills and loses its flotation, it rotates in the counterclockwise direction, raising the weir edge 28.

To maintain the weir edge 28 at a constant depth, a suction conduit 34 is secured to the frame 12 as shown in FIG. 1 and has an inlet end 36 positioned in the cylinder 24 at a suitable distance from the bottom thereof, the outlet end 38 being adapted for connection to a pump, not shown.

It will be appreciated that the depth of skim over the weir 28 is equal to, and controlled by the rate of suction and withdrawal of the fluid from cylinder 24. This allows a minimum amount of water to be removed with oil and control of the depth of skim from an on shore location.

By way of example only, the cylinder 24 may be approximately twenty-two inches in diameter and of any desired length, say between two and eight feet depending on the desired capacity range. The shaft 18 is positioned at a point nine and a half inches from the weir edge 28, two inches off center from the radius of eleven inches of the end plates 30, the central longitudinal axis of the cylinder. The rear float 16 is approximately six inches in diameter and the side floats 14 are ten inches in diameter. The basic metal structure is formed of aluminum.

Referring to FIGS. 5 and 6 a further embodiment of the invention comprises a skimming device 34 having side floats 36 secured to and spaced by a rear float 38. Each side float 36 has a vertical bracket 40 secured to its front end to which may be attached booms to divert oil to the device 34. Each side float 36 is divided into three separate compartments with filler plugs 42 therein. Water or other suitable fluid may be placed in the compartments to adjust the level of the skimming device 34 in the water as various boom configurations and suction hose hookups exert varying weights on the device 34.

The reservoir 44 has a flattened surface 46 to reduce rocking from uneven pump suction and rough water conditions. Reservoir 44 is mounted on a shaft 48 which is pivotally secured in the inner sides of floats 36 by a conduit 50 welded to the sides of the float 36 as shown in FIG. 6 and to provide not only a passage for the shaft 48 but also to provide a water tight seal in the floats 36. Shaft 48 also serves to hold the floats 36 together.

Deflecting plates 52 are provided on the inner sides of floats 36 to divert oil into the reservoir over its weir edge 54 rather than letting it travel past.

Suction conduits 56 are positioned as shown and secured to the rear float 38 by brackets 58.

Skimming devices of four foot widths are normally equipped with two three-inch suction conduits and eight foot models are normally provided with three conduits.

As shown in FIGS. 6 and 7 the device 34 may be provided with a trash collecting means 60 comprising a plurality of screened wings 62 secured to a shaft 64. The latter extends across the front of the device 34 and is mounted on a pair of brackets 66, 68 on the floats 36. The screen wings 62 collect trash floating on the water that would otherwise plug the suction conduits 56.

Each end of the shaft 64 is provided with three slots as at 70 (FIG. 6). Bracket 66 (FIG. 7) comprises a pair of spaced plates 72, 74 and a lever 76 pivoted therebetween. Lever 76 has a dog 78 thereon and, when latched in the FIG. 6 position, dig 78 engages a slot 70 to prevent the shaft 64 from rotating.

It will be appreciated that to clean the trash collector, it is necessary only to lift the latch 76, rotate the screen wings 62 one third of a turn clockwise in FIG. 6 and lift the collected debris from the wings. This positions a new section of screen in the skimming position, with one wing 62 straight downward and the other two sections above the water as illustrated in FIG. 6.

In the embodiment of FIGS. 5 to 7, a four foot reservoir has a skimming capacity of up to fifteen barrels a minute and this capacity is increased to approximately thirty barrels with an 8 foot reservoir.

We claim:

1. A device for removing oil and like products from the surface of water comprising a spaced pair of float members; an elongated, open-sided reservoir having a weir edge extending substantially parallel with the reservoir longitudinal axis; and mounting means coupled to the longitudinal ends of said reservoir at a point between the reservoir longitudinal axis and the weir edge and rotatably mounting said reservoir on said float members to allow the depth of fluid within said reservoir to control the degree of rotation of said reservoir relative to said float members, whereby the rate of removal of skimmed fluid from the reservoir controls the depth of skim.

2. A device according to claim 1 including a third float member secured to and extending between said pair of spaced float members, and at least one suction conduit secured to said third float member and having an inlet end positioned in said reservoir.

3. A device according to claim 1 wherein said reservoir is cylindrical in shape with a flattened side facing outwardly.

4. A device according to claim 1 including means on the sides of said pair of float members for diverting oil into said reservoir.

5. A device according to claim 1 including a rotatable trash collecting means mounted to and extending between said pair of float members and comprising a three segment screen pivotally attached at its ends to said float members.

6. A device according to claim 1 wherein said float members are compartmented with closures for adding fluid therein.

7. A device according to claim 1 including a suction conduit having an inlet end positioned in said reservoir.

* * * * *